United States Patent Office 3,557,262
Patented Jan. 19, 1971

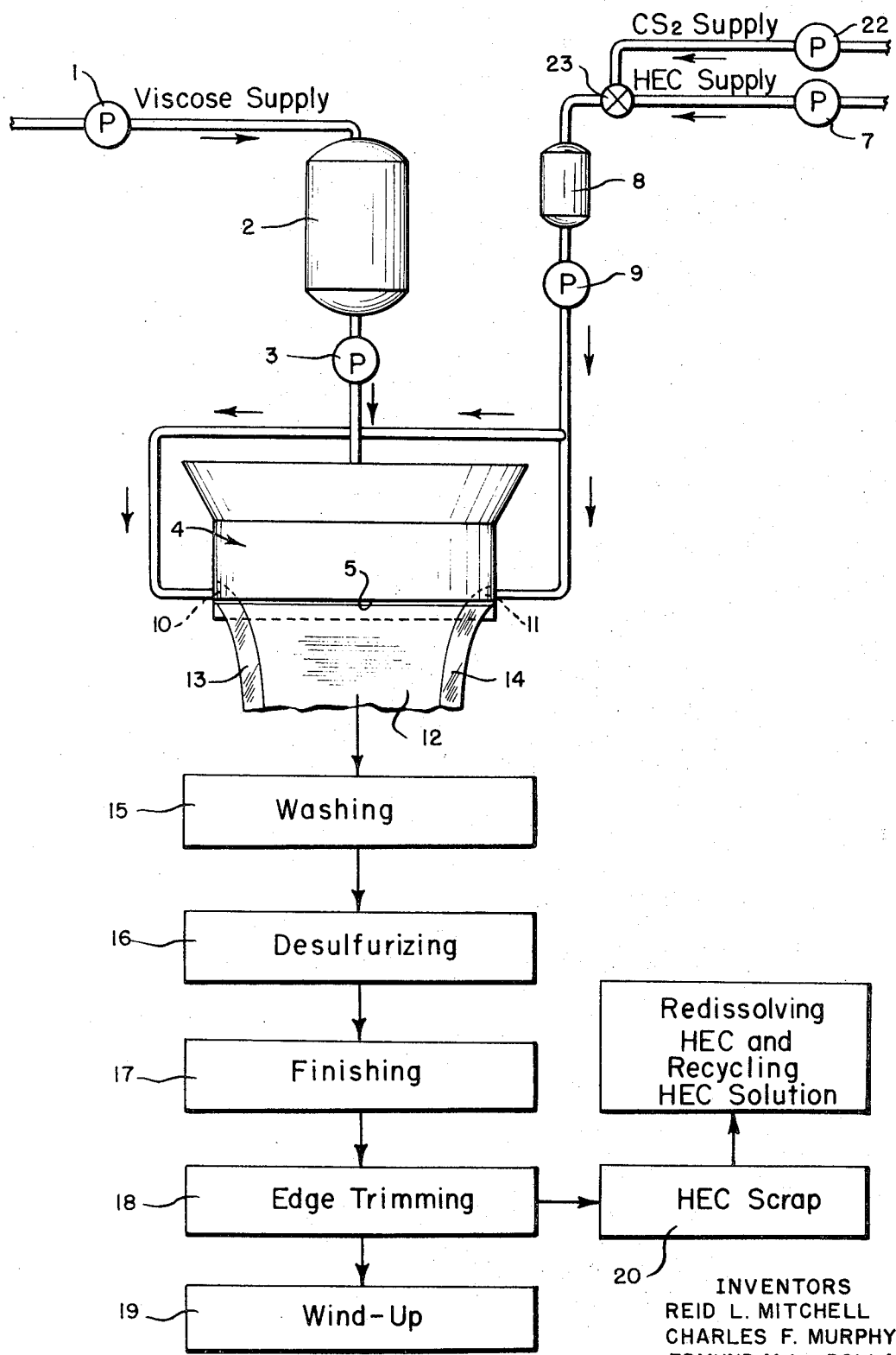

3,557,262
METHOD OF PREPARING TRANSPARENT CELLULOSIC FILM
Reid L. Mitchell, Charles F. Murphy, and Edmund M. La Polla, Morris County, N.J., assignors to ITT Rayonier Incorporated, New York, N.Y., a corporation of Delaware
Filed May 10, 1968, Ser. No. 728,263
Int. Cl. B29h *19/00;* C08b *3/22;* C09j *3/04*
U.S. Cl. 264—37                                  7 Claims

ABSTRACT OF THE DISCLOSURE

Transparent cellulosic film having a longitudinally extending center portion comprising regenerated cellulose and integrally formed longitudinally extending edge portions comprising hydroxyethylcellulose (HEC) is produced by extruding a viscose casting solution through the center portion of the film extrusion slit of a viscose casting hopper while concurrently extruding an HEC casting solution through the immediately adjoining edge portions of said film extrusion slit, said solutions being extruded into a conventional acidic regeneration bath to form the aforesaid multi-component film of regenerated cellulosic material.

BACKGROUND OF THE INVENTION

Transparent film of regenerated cellulose (cellophane) is ordinarily produced by continuously extruding a caustic viscose casting solution through the film extrusion slit of a viscose casting hopper into an acidic viscose regenerating bath to form a film of coagulated cellulose xanthate and partially regenerated cellulose. The film is continuously withdrawn from the regenerating bath, and then is washed, desulphurized to complete the regeneration of the cellulose, finished, dried and wound up on a suitable takeup reel in a manner known in the art. The film shrinks quite drastically during the coagulation and regeneration operations and during subsequent treatment of the film, the width of the finished film being reduced to as little as 60% of the original width of the viscose casting solution as extruded. Shrinkage of the film and the consequent unevenness of the longitudinal edges thereof make it necessary to trim the edges of the film, either before the film is wound up on the takeup reel or in a subsequent edge trimming operation, in order to consistently produce a film of predetermined width. The regenerated cellulose film trimmed from the edge of the main body of the film cannot be economically reconverted into the viscose for recycling through the process, and as a consequence the trimmed edges of the film is unrecoverable scrap material that represents a substantial economic loss to the manufacturer of the film.

Transparent films of hydroxyethylcellulose (HEC) can be produced by extruding a caustic HEC casting solution through the extrusion slit of a casting hopper into an acidic regeneration bath in much the same manner as in the case of regenerated cellulose films. HEC film has greater dimensional stability than cellophane as well as other desirable characteristics, including the fact that scrap HEC film can be recovered by redissolving the HEC in a suitable caustic solution. Since both HEC and viscose solutions can be cast from similar caustic solutions and gelled or regenerated in similar extrusion baths, it has heretofore been proposed that casting solutions containing both of these cellulosic materials be extruded to produce a transparent film combining the desirable properties of both materials. However, when alkaline HEC and viscose solutions are mixed together the HEC tends to rob the viscose of its xanthate groups which, in turn, causes the xanthate-depleted viscose to gel prematurely in lines and to form crusts on casting hopper lips, etc. As a result, the extrusion of mixtures of alkaline viscose and HEC casting solutions to form transparent films therefrom has not heretofore been a practical or commercially feasible proposition.

SUMMARY OF THE INVENTION

In the course of an intensive investigation into the problem of producing regenerated cellulose film with a minimum of loss of cellulosic material due to the necessary edge trimming operation, we have made the surprising discovery that the wasteful loss of this scrap material can be substantially eliminated by producing a multi-component transparent film the center portion of which comprises essentially regenerated cellulose and the longitudinally extending edge portions of which comprise essentially hydroxyethylcellulose. We have further discovered that this multi-component film can be produced by continuously extruding a conventional alkaline viscose casting solution through the center portion of the film extrusion slit of a film casting hopper into an acidic regenerating bath while concurrently extruding an alkaline hydroxyethylcellulose casting solution through the immediately adjoining edge portions of the same film extrusion slit into the same regenerating bath. The multi-component film that is formed as a result of the extrusion operation is withdrawn from the regeneration bath, and then is washed, desulphurized, finished, dried, edge trimmed and wound on a suitable wind-up reel in the usual manner. The strips of scrap HEC trimmed from the two longitudinal edges of the film are recovered, redissolved in a caustic solution and, if desired, recycled to the HEC casting solution.

The HEC edge portions of the multi-component film are extruded by introducing the HEC casting solution into the casting hopper at points immediately adjacent each end (or edge-forming portion) of the film extrusion slit of the hopper, the remainder of the hopper being filled with the viscose casting solution. Although some slight intermixing of the viscose and the HEC casting solutions occurs in the hopper at the interface of these two solutions adjacent each end of the film extrusion slit, the contacting solutions are immediately extruded and converted into film before the HEC can rob the viscose of any significant amount of the xanthate groups. In this connection we have further discovered that the tendency of the dissolved HEC to rob the viscose of its xanthate sulphur can be inhibited or substantially prevented by adding liquid carbon disulfide to the HEC solution in an amount ranging from 0.2 to 20 percent, and preferably from about 1 to 2 percent, by weight of the solution. Furthermore, we have found that the $CS_2$-containing HEC solution can be directly and intimately mixed with the viscose solution without causing incipient gellation of the viscose provided the mixture is immediately cast to form a cellophane HEC film.

BRIEF DESCRIPTION OF THE DRAWING

The single figure of the accompanying drawing is a schematic flow sheet of an advantageous embodiment of our process and the multi-component film produced thereby.

DETAILED DESCRIPTION

As previously described, the multi-component transparent cellulosic film of our invention is produced by simultaneously extruding an alkaline viscose casting solution and an alkaline hydroxyethylcellulose casting solution through the center portion and the two edge portions, respectively, of the film extrusion slit of a film casting hopper into an acidic regeneration bath. The alkaline viscose casting solution is prepared by conventional procedures well known in the art and advantageously contains from 6 to 10 percent by weight cellulose xanthate and from about 5 to 8 percent by weight sodium hydroxide in a deaerated aqueous solution. The viscose solution also advantageously contains up to 30 percent by weight of carbon disulfide based on the cellulose content thereof to retard gelation of the viscose. The alkaline HEC casting solution is also prepared by conventional procedures known in the art and advantageously comprises from about 6 to 10 percent by weight HEC and from about 5 to 8 percent sodium hydroxide in a deaerated aqueous solution. In addition, the alkaline HEC solution advantageously contains from 0.2 to 20 percent by weight and preferably from about 1 to 2 percent by weight, carbon disulfide based on the total weight of the solution. The film casting hopper employed in the practice of the invention is of conventional construction, and the acidic regeneration bath is also of the type usually employed in conventional viscose film casting processes. Moreover, the subsequent washing, desulphurizing, drying, edge trimming and other film finishing operations are all entirely conventional.

Referring now to the single figure of the accompanying drawing, in the preferred embodiment of our process the pump 1 delivers the deaerated alkaline viscose casting solution to a storage and ripening tank 2 from which it is delivered by a metering pump 3 to the film casting hopper 4 of a conventional film casting machine. In like manner, the alkaline HEC casting solution is delivered by the pump 7 to the storage tank 8 from which it is delivered by a metering pump 9 to the film casting hopper 4, the HEC solution being introduced into the hopper 4 through the inlet ports 10 and 11 adjacent each end of the film casting slit 5 of the hopper. The viscose casting solution substantially completely fills the casting hopper 4 and is extruded in the form of a thin film of predetermined thickness through the film casting slit 5 of the hopper 4 into an acidic regenerating bath (not shown). However, the HEC solution introduced into the hopper 4 through the ports 10 and 11 displaces an equal volume of the viscose solution at each end of the film extrusion slit 5 as indicated by the dotted lines in the drawing. As a result, the two solutions are extruded concurrently through the film extrusion slit 5 into the acidic regeneration bath where the solutions are immediately coagulated and converted into a film having a longitudinally extending center portion 12 of regenerated cellulose and two longitudinally extending edge portions 13 and 14 of HEC.

The relative amounts of viscose and HEC casting solutions delivered to the casting hopper 4 by the metering pumps 3 and 9 are not critical. However, we presently prefer that the amount of the HEC solution be between about 2 to 10 percent by volume of that of the viscose solution, this HEC solution being equally divided between the inlet ports 10 and 11. As a result, the width of the HEC strip disposed along each longitudinal edge of our new multi-component film is approximately from 1 to 5 percent of the total width of the film. The processing of the multi-component film withdrawn from the acidic regeneration bath is completed in any suitable manner. For example, the film may be subjected successively to a washing step 15, a desulphurizing step 16 to complete the regeneration of the cellulose component of the film, a finishing or softening step 17 and an edge trimming step 18, following which the finished film is wound up on a suitable wind-up reel 19 or the like. These film finishing steps are, as previously mentioned, entirely conventional and the exact nature and sequence of the steps may be varied as known in the art.

The longitudinal edges of the finished film are trimmed to remove irregularities and to produce a film of the desired width. The edges trimmed from the film are essentially pure HEC, and this scrap material 20 can readily be dissolved in an aqueous solution of sodium hydroxide to recover the HEC in potentially useful form. This alkaline solution of HEC, for example, is advantageously recycled to the storage tank 8 for re-use in our process.

As previously noted, it is known that when alkaline HEC solutions are mixed with alkaline viscose solutions the HEC tends to rob the viscose of its xanthate groups. As a result, the xanthate-depleted viscose tends to gel prematurely in lines and tanks and to form crusts on casting hopper lips. Although in the practice of our invention there is some mixing of the HEC and viscose casting solutions at the interface of these solutions in the casting hopper 4, the two solutions are almost immediately extruded and coagulated by the regeneration bath before the loss of xanthate groups becomes critical and causes the viscose to gel prematurely to any significant extent. Moreover, we have found that premature gellation of the viscose in contact with the HEC solution in the hopper 4 can be substantially completely inhibiter or prevented by incorporation of from 0.2 to 20 percent by weight, and preferably from about 1 to 2 percent by weight, carbon disulfide in the HEC casting solution, based on the total weight of the solution. Thus, as shown in the drawing liquid carbon disulfide is delivered by the pump 22 to the mixing valve 23 where it is intimately mixed with the HEC casting solution flowing into the storage tank 8. The prevention of premature gellation of the viscose in the hopper and on the lips of the film extrusion slit 5 is of special importance in the production of commercially acceptable transparent cellulosic film. Accordingly, the addition of carbon disulfide to the HEC casting solution is particularly advantageous in large scale commercial casting operations where the quantities of the casting solutions employed and their residence time in the hopper in contact with each other is apt to be greater than in smaller scale operations.

The following examples are illustrative, but not limitative, of the practice of our invention:

EXAMPLE 1

A viscose casting solution was prepared by conventional methods, the deaerated solution containing 9.0 percent by weight cellulose having a degree of polymerization of 300, 5.6 percent by weight sodium hydroxide and 28 percent by weight carbon disulfide based on the cellulose content of the solution. The viscose solution was pumped to a storage and ripening tank and thence by a metering pump to the casting hopper of a film casting machine. Similarly, an HEC casting solution was prepared by dissolving HEC produced by the process described in U.S. Pat. 3,045,097 in a caustic aqueous solution, the resulting HEC solution containing 9.0 percent by weight HEC and 5.6 percent by weight sodium hydroxide. The deaerated HEC solution was pumped to a storage tank and from there by a metering pump to two solution inlet ports located on each side of the casting hopper adjacent the film extrusion slit of the hopper, the amount of HEC solution delivered to the hopper being about 5 percent by volume of that of the viscose solution. The viscose in the casting hopper was extruded through the film extrusion slit of the hopper into a conventional acidic regenerating bath as in conventional viscose film casting. At the same time, the HEC solution delivered to the sides of the casting hopper was extruded in the form of two narrow streams in contact with the longitudinal edges of the extruded stream of viscose solution. The viscose and HEC solutions immediately coagulated to form a film which was removed from the regenerating bath and then desulphurized, finished and dried in the usual manner. After finishing and drying the viscose and HEC film, the edges of the film were trimmed of 2 percent of their width on each side of the film by the usual film slitting equipment. The scrap film from the edge trimming operation was essentially pure HEC, and this scrap was found to be soluble in an aqueous sodium hydroxide solution. The HEC in solution could be recovered by recycling this solution to the HEC storage tank.

EXAMPLE 2

The process of Example 1 was repeated except that liquid carbon disulfide in the amount of 5 percent by weight based on the total weight of the solution was introduced into the HEC solution being delivered to the storage tank. The addition of the carbon disulfide to the alkaline HEC solution inhibited incipient gellation of viscose in contact with the HEC solution in the casting hopper.

It is known that transparent films of HEC have greater dimensional stability (i.e., exhibit less shrinkage) than comparable films of regenerated cellulose. It is also known that films comprising a mixture of HEC and regenerated cellulose possess greater dimensional stability and other desirable properties than regenerated cellulose alone. However, as previously noted, the addition of HEC to viscose film casting solutions tends to cause the viscose to gel prematurely due to depletion of its xanthate groups by the HEC.

In the course of our work with HEC and viscose casting solutions, we have found that the tendency of the viscose to gel prematurely in tanks, lines and in the casting hopper can be overcome if the HEC and viscose casting solutions are intimately blended together, advantageously by means of an in-line mixer of the Oakes type, and the homogeneous solution is then immediately extruded into the acidic regenerating bath before the HEC has an opportunity to react with the xanthate sulphur of the viscose. Moreover, we have found that the tendency of the HEC to rob the viscose of its xanthate groups can be substantially inhibited or prevented by the addition of liquid carbon disulfide to the HEC solution prior to mixing the HEC solution with the viscose solution.

The following example illustrates the production of multi-component film the center portion of which comprises a mixed HEC and regenerated cellulose material prepared as hereinabove described.

EXAMPLE 3

The process of Example 1 was repeated except that, in addition to the HEC casting solution being introduced into the casting hopper adjacent each end of the film extrusion slit, an alkaline HEC casting solution containing 5 percent by weight carbon disulfide was introduced into the stream of the viscose casting solution being delivered to the casting hopper, the amount of the HEC casting solution being equal in volume to the volume of the viscose casting solution. The viscose and HEC solutions were homogeneously mixed together with an in-line mixer of the Eppenbach type, and the uniformly mixed solution of viscose and HEC was then immediately extruded to form a multi-component film the center portion of which comprised regenerated cellulose and HEC having greater dimensional stability than that of a conventional 100 percent viscose film.

We claim:

1. Process for making transparent film of regenerated cellulosic material having a longitudinally extending center portion consisting essentially of regenerated cellulose and two longitudinally extending edge portions integrally formed with said center portion and consisting essentially of hydroxyethylcellulose, said process comprising continuously extruding an alkaline viscose casting solution through the center portion of the film extrusion slit of a film casting hopper into an acidic regenerating bath while concurrently extruding an alkaline hydroxyethylcellulose casting solution through the immediately adjoining edge portions of said film extrusion slit into said regenerating bath, whereby a continuous multi-component film of regenerated cellulosic material is formed, and trimming said edge portions to remove a part thereof and recycling the trimmed part for reuse in the process after dissolving the hydroxyethylcellulose.

2. The process according to claim 1 in which the viscose casting solution is a deaerated caustic solution containing, based on the total weight thereof, from about 6 to 10 percent by weight cellulose xanthate and from about 5 to 8 percent by weight sodium hydroxide, and in which the hydroxyethylcellulose casting solution is a deaerated caustic solution containing, based on the total weight thereof, from about 6 to 10 percent by weight HEC and from about 5 to 8 percent by weight sodium hydroxide.

3. The process according to claim 1 in which the hydroxyethylcellulose casting solution contains, based on the total weight thereof about 9 percent by weight HEC and about 5.6 percent by weight sodium hydroxide.

4. The process according to claim 1 in which the hydroxyethylcellulose casting solution contains, based on the total weight thereof from about 0.2 to 20 percent by weight carbon disulfide.

5. The process according to claim 1 in which the hydroxyethylcellulose casting solution contains, based on the total weight thereof from about 1 to 2 percent by weight carbon disulfide.

6. The process according to claim 1 in which the cellulosic constituent of the viscose casting solution consists essentially of cellulose xanthate.

7. The process according to claim 1 in which the viscose casting solution comprises an intimate mixture of from 50 to 99 percent by volume of a caustic viscose solution containing, based on the total weight thereof, 6 to 10 percent by weight cellulose xanthate and 5 to 8 percent by weight sodium hydroxide, and from 1 to 50 percent by volume of a caustic hydroxyethylcellulose solution containing, based on the total weight thereof, 6 to 10 percent by weight HEC, 5 to 8 percent by weight sodium hydroxide and 0.2 to 20 percent by weight carbon disulfide, and the said solutions being intimately admixed just prior to extrusion of said mixture.

References Cited

UNITED STATES PATENTS

| | | | |
|---|---|---|---|
| 2,068,630 | 1/1937 | Richter | 264—218 |
| 2,141,776 | 12/1938 | Vautier et al. | 264—173 |
| 2,227,682 | 1/1941 | Wade | 264—173 |
| 2,704,860 | 3/1955 | Russell | 264—187 |
| 2,337,928 | 12/1943 | Reichel | 264—37 |
| 3,448,183 | 6/1969 | Chisholm | 264—171 |

ROBERT F. WHITE, Primary Examiner

J. R. THURLOW, Assistant Examiner

U.S. Cl. X.R.

106—168; 260—230, 232; 264—171, 188, 195